(12) United States Patent
Meaney (10) Patent No.: US 7,899,877 B2
(45) Date of Patent: Mar. 1, 2011

(54) METHOD FOR DYNAMICALLY MANAGING MULTICAST SESSIONS FOR SOFTWARE DOWNLOADS AND RELATED SYSTEMS

(75) Inventor: Roy Meaney, Ballyneety (IE)

(73) Assignee: Dell Products L.P., Round Rock, TX (US)

( * ) Notice: Subject to any disclaimer, the term of this patent is extended or adjusted under 35 U.S.C. 154(b) by 1039 days.

(21) Appl. No.: 11/130,870

(22) Filed: May 17, 2005

(65) Prior Publication Data

US 2006/0265709 A1    Nov. 23, 2006

(51) Int. Cl.
G06F 15/16    (2006.01)
(52) U.S. Cl. .......................................... 709/207; 709/227
(58) Field of Classification Search .................... 709/207
See application file for complete search history.

(56) References Cited

U.S. PATENT DOCUMENTS

| | | | |
|---|---|---|---|
| 5,604,906 A | 2/1997 | Murphy et al. | 395/712 |
| 5,857,072 A | 1/1999 | Crowie | 395/200.33 |
| 6,009,274 A | 12/1999 | Fletcher et al. | 395/712 |
| 6,108,697 A | 8/2000 | Raymond et al. | 709/218 |
| 6,256,673 B1 | 7/2001 | Gayman | 709/232 |
| 6,600,743 B1 | 7/2003 | Lee et al. | 370/390 |
| 6,684,331 B1 | 1/2004 | Srivastava | 713/163 |
| 6,772,192 B1 | 8/2004 | Fulton et al. | 709/203 |
| 2003/0236863 A1 | 12/2003 | Johnson et al. | 709/219 |
| 2005/0243776 A1 * | 11/2005 | Kawabata et al. | 370/337 |
| 2006/0236320 A1 | 10/2006 | Chen et al. | 717/176 |
| 2007/0150892 A1 * | 6/2007 | Chaney | 717/177 |

FOREIGN PATENT DOCUMENTS

| | | |
|---|---|---|
| JP | 2004-157753 | 3/2004 |
| WO | 02/35348 | 5/2002 |

OTHER PUBLICATIONS

Chapter 43, "*Internet Protocol Multicast*" (2000).
Cisco Systems, "*Cisco IOS Multicast Solutions for Internet Broadcast*," Data Sheet (2000).
Scala, Inc., "*Introduction to IP Multicast Transmission*," Apr. 2003.
Symantec Enterprise Administration, Symantec Ghost™ Corporate Edition, "*Comprehensive Solution for Enterprise PC Management, User Migration, and Software Deployment*," (Oct. 2003).
Irish Patent Office, Application No. 2005/0324, Search Report, Mar. 20, 2007.

* cited by examiner

*Primary Examiner* — Hassan Phillips
*Assistant Examiner* — Ryan J Jakovac
(74) *Attorney, Agent, or Firm* — O'Keefe, Egan, Peterman & Enders, LLP (57) ABSTRACT

Methods and systems are disclosed for dynamically managing multicast sessions for software downloads and, more particularly, for such software downloads used in build-to-order manufacturing information handling systems. Multiple multicast sessions are automatically managed simultaneously, where each session can have its own unique set of session parameters, in such a way as to support a high mix, high volume manufacturing build-to-order environment. Multicast session control parameters, such as start time and client count, are defined for each multicast session base upon download requests from the information handling systems as they reach the software installation phase.

10 Claims, 4 Drawing Sheets

METHOD FOR DYNAMICALLY MANAGING MULTICAST SESSIONS FOR SOFTWARE DOWNLOADS AND RELATED SYSTEMS

TECHNICAL FIELD OF THE INVENTION

This invention relates to the management of multicast software downloads and, more particularly, to the download of software to information handling systems in a manufacturing environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are manufactured using build-to-order manufacturing processes. As part of this process, datasets are typically downloaded to the information handling system. These datasets can include, for example, operating system software, application software, other software, data files and customer specific images or interfaces. This dataset download process can be implemented manually; however, it is more efficiently implemented through a network infrastructure such that a database of information provides the source for datasets being downloaded to the build-to-order information handling systems. One problem with current network infrastructures is the limited bandwidth provided between the server system, which controls the database, and the client machines to which datasets are being downloaded.

IP multicasting protocols, which are currently known and implemented by a variety of vendors, enable a file server to send a single copy of a file to multiple clients simultaneously. As such, multicasting can be far more efficient than requiring the server to send an individual copy of a file to each client (often referred to as point-to-point unicast). With respect to this point-to-point unicast, the number of clients is restricted by the amount of bandwidth available to the server, as each client will consume an equal amount of the bandwidth available. As more clients attach to the server the download speed decreases dramatically. With IP multicast only one stream of data is sent out for all clients, therefore there is no limit to the number of clients that can download a file from the server at the same time. Also, the reduced usage in bandwidth can result in faster download speeds. Although several third-party software installation tools or hard disk imaging tools exist which support IP multicast (e.g., Ghost, PowerQuest, ImageCast, Rembo and OmniCast), none of these tools provide a method to resolve automatically the unique set of parameters that are needed for each session in a build-to-order manufacturing process. Although these tools provide either a programming interface or a command-line interface, the person using these tools must manually provide the session parameters for each multicast session. As such, these prior multicast tools are suited only to large pre-scheduled downloads where one is guaranteed that all clients are available to perform the download at a specified time. In a build-to-order manufacturing process, or other environments where the clients to participate are not known in advance, the existing IP multicast tools do not provide an adequate solution to software downloads.

SUMMARY OF THE INVENTION

The present invention provides systems and methods for dynamically managing multicast sessions for software downloads and, more particularly, for such software downloads used in the manufacture of information handling systems. The present invention, for example, can be used to manage multicast sessions for IP multicasts in a build-to-order environment or any other environment where the session's clients are not known ahead of time. The present invention provides a process that automatically manages multiple multicast download sessions simultaneously, where each session can have its own unique set of session parameters, in such a way as to support a high mix, high volume manufacturing environment. As part of the process, the present invention can assign each client needing a software download to a relevant multicast session by providing it with the correct session name.

In one embodiment, the present invention is a manufacturing system for information handling systems including a managed multicast download system, including a manufacturing line, multicast infrastructure, and a multicast session manager. The manufacturing line includes a software installation phase in which datasets are downloaded to a plurality of information handling systems through a plurality of multicast downloads. The multicast infrastructure is configured to download datasets to the information handling systems through a plurality of multicast downloads. The multicast session manager is configured to receive multicast download requests related to the information handling systems when they reach a software installation phase, to create a plurality of multicast sessions based upon the requests, to assign each information handling system to a multicast session, and to provide one or more multicast session control parameters to the multicast infrastructure. The multicast session parameters can include, for example, a start time associated with each multicast session and a client count associated with each multicast session. As described below, other features and variations can be implemented, if desired, and related methods can be utilized, as well.

In another embodiment, the present invention is a method for managing multicast downloads for information handling systems, including receiving multicast download requests related to a plurality of information handling systems when they reach a software installation phase, creating a plurality of multicast sessions based upon the requests, assigning each information handling system to at least one multicast session, and downloading one or more datasets to the information handling systems using the plurality of created multicast sessions. As described below, other features and variations can be implemented, if desired, and related systems can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention provides systems and methods for efficiently downloading software to information handling systems in software download environments. One example software download environment is a software installation phase within a manufacturing line for information handling systems. Whereas current manufacturing processes typically use point-to-point unicast methods to perform software downloads, IP multicast techniques can greatly increase the efficiency of this software download process because the number of clients is not limited by server network bandwidth. The present invention solves the problem of applying IP multicast to the build-to-order environment or any other environment where the sessions clients are not known ahead of time. In particular, the present invention provides a process that automatically manages multiple multicast download sessions simultaneously, where each session can have its own unique set of session parameters, in such a way as to support a high mix, high volume manufacturing build-to-order environment. Furthermore, the present invention can automatically assign each client to a relevant multicast session by providing it with the correct session name. Advantageously, the reduced usage in bandwidth on the network, as a result using IP multicast, can result in much higher download speeds, with no limit to the number of clients attached.

According to the present invention, dynamic multicast sessions use some or all of the following session parameters: (a) the session name, which typically must be unique on the network, (b) the file(s) or dataset to be downloaded as part of the session (as requested by the clients), (c) the IP multicast address to use for the session (taken from a pool of available addresses), (d) the amount of bandwidth to use for the session, (e) the client count, which is the number of clients to wait for to join the session before starting the download, and/or (f) the start time, which is the time to start the download if the number of clients to wait for is not specified or if not all of the clients have joined the session by that time. If the start time and the client count are both specified, as discussed in more detail below, then the download begins as soon as one of these two conditions is met. Advantageously, the present invention can automatically, and dynamically, determine the session parameters based on current demand based upon download requests, create the individual multicast sessions as they are required, and provide the clients with the name of the multicast session to join in order to download the requested file(s) or dataset.

Figure 1:
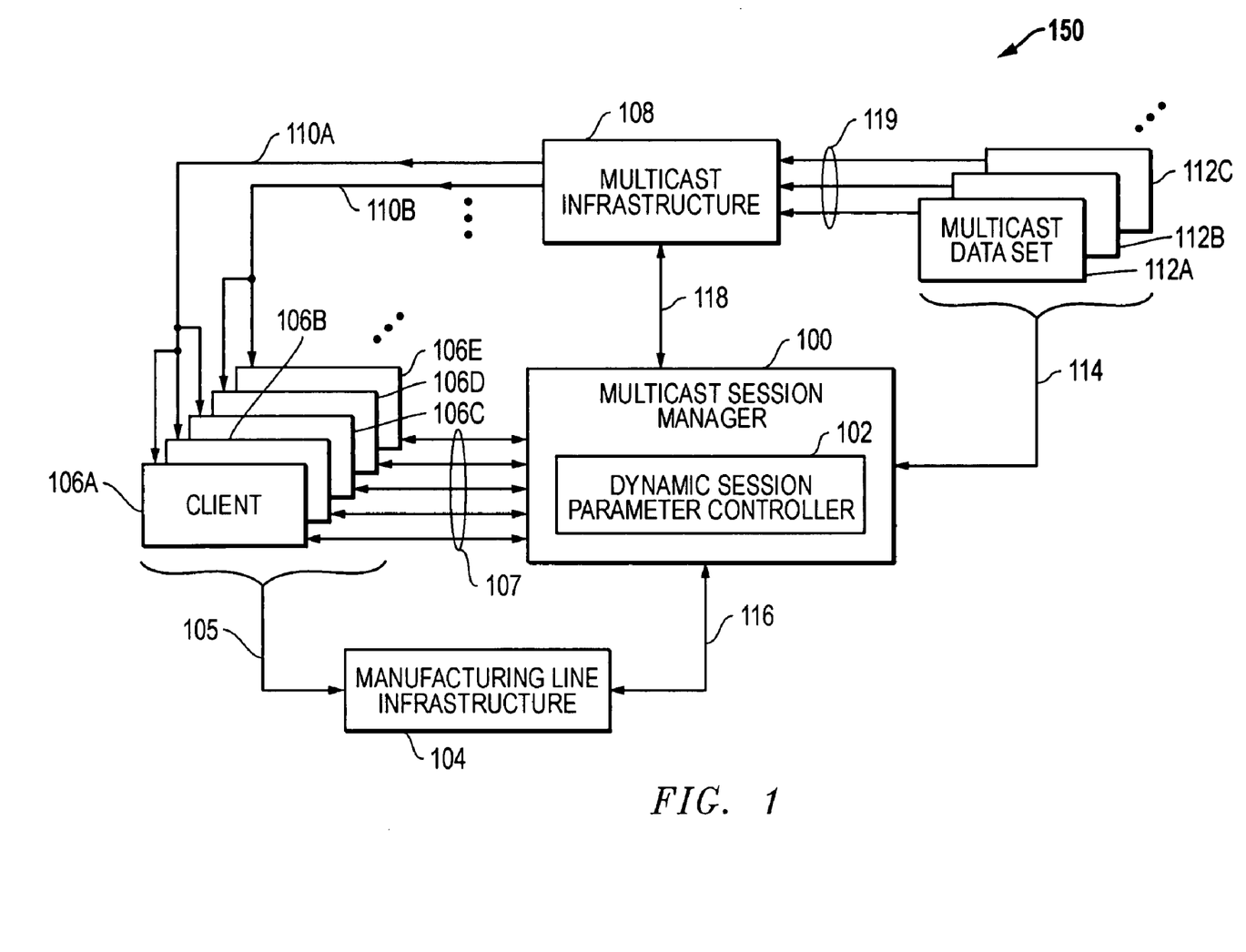
FIG. 1 is a block diagram for an embodiment of a dynamically managed multicast system, according to the present invention, in a manufacturing environment.

FIG. 1 is a block diagram for an embodiment 150 of a dynamically managed multicast system, according to the present invention, in a manufacturing environment. As depicted, a manufacturing line infrastructure 104, such as a build-to-order manufacturing system for information handling systems, includes a number of clients 106A, 106B, 106C, 106D, 106E . . . that are being manufactured and that need datasets downloaded to them. Bracket and line 105 represent the fact that clients 106A, 106B, 106C, 106D, 106E . . . are being manufactured or processed through the manufacturing line infrastructure 104. The clients 106A, 106B, 106C, 106D, 106E . . . can be configured to communicate through communication channels 107 with multicast session manager 100. In addition, the manufacturing line infrastructure 104 can also communicate with the multicast session manager 100 through communication channel 116. The multicast session manager 100 includes a dynamic session parameter controller 102 that receives download requests, creates multicast sessions, and determines multicast session parameters, as needed. In addition, the multicast session manager 100 communicates with multicast infrastructure 108 through communication channel 118 and, as represented by bracket and line 114, the multicast session manager 100 has information about the multicast datasets 112A, 112B, 112C . . . available for download to the clients 106A, 106B, 106C, 106D, 106E . . . through the multicast infrastructure 108.

The multicast infrastructure 108 operates to provide IP multicast services for the clients 106A, 106B, 106C, 106D, 106E . . . based upon the session parameters set by the multicast session manager 100. Depending upon those dynamically managed parameters, the multicast infrastructure 108 receives datasets 112A, 112B, 112C . . . through communication channels 119, for example, from one or more database servers, and broadcasts those datasets 112A, 112B, 112C . . . to the clients 106A, 106B, 106C, 106D, 106E . . . in one or more multicast sessions. As depicted, clients 106A, 106B and 106C are receiving downloads through multicast session 110A, and clients 106D and 106E are receiving downloads through multicast session 110B.

It is noted that the communication channels 107, 110A, 110B, 114, 116, 118 and 119 can be wireless or wired communication channels, as desired, and these communication channels can also take advantage of one or more intervening communication systems in order to provide communications between system components. It is also noted that the multicast infrastructure 108 can be implemented using one or more devices, including multicast server systems running multicast controller and/or multicast application programs, multicast-enabled routers, and/or other multicast systems, as desired. For example, Cisco Systems sells multicast-enabled routers and network infrastructure.

Figure 2:
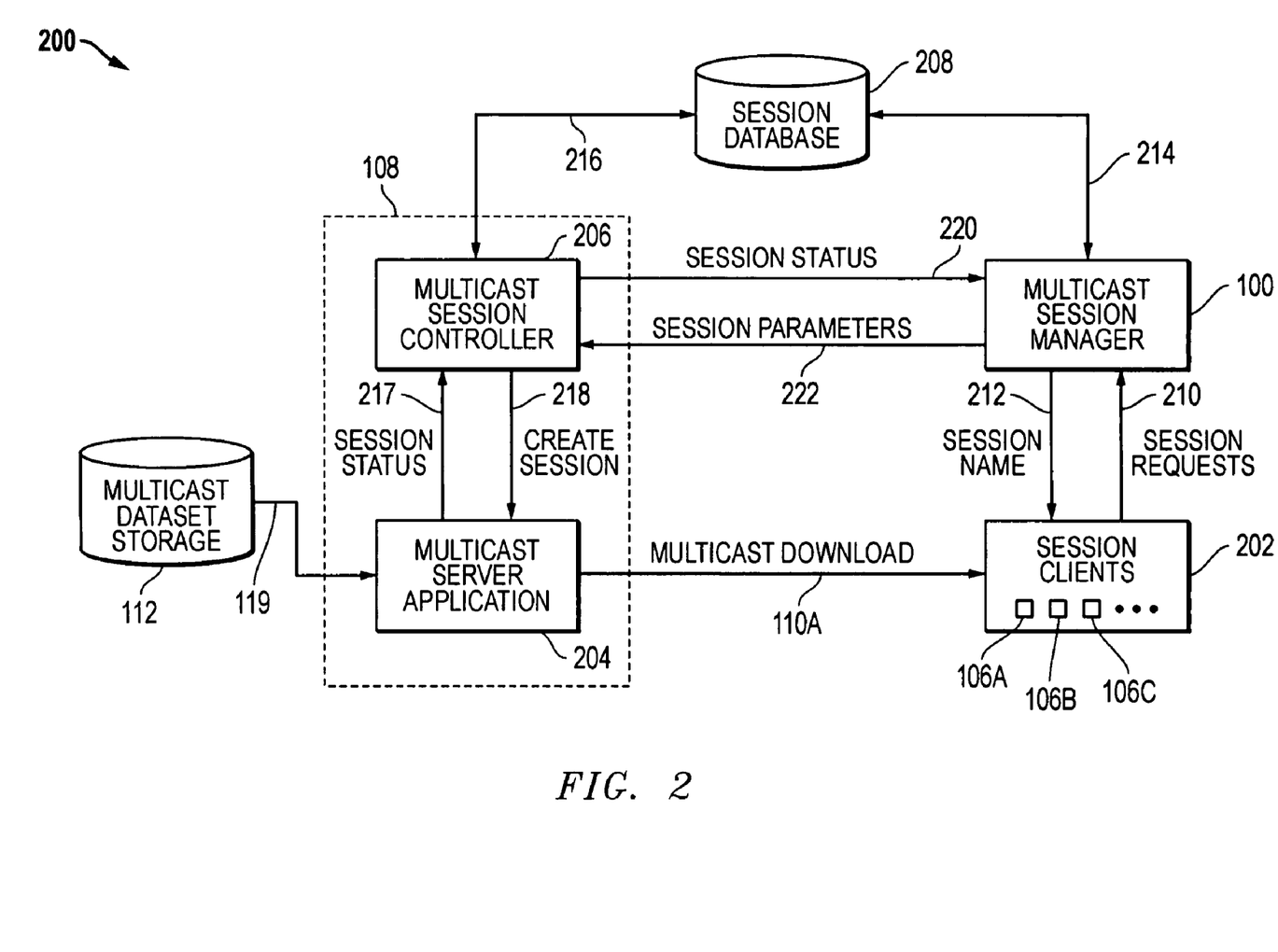
FIG. 2 is a block diagram for an embodiment of a multicast environment using a dynamically managed multicast system, according to the present invention.

FIG. 2 is a block diagram for an embodiment 200 of a multicast environment using a dynamically managed multicast system, according to the present invention. As depicted, multicast infrastructure 108 includes multicast session controller 206 and multicast server application 204, which can be, for example, software operating on one or more server systems. When client systems are ready for downloads, session requests 210 are sent for the clients to the multicast session manager 100. These session requests 210 can be generated by the clients themselves or by some other system that is monitoring the condition or state of the clients. Once it receives the session requests 210, the multicast session manager 100 creates new multicast sessions, as needed, and manages the sessions parameters, for example, by sending session parameters 222 for new multicast sessions to the multicast session controller 206. The multicast session manager 100 receives back session status information 220 from the multicast session controller 206. The multicast session manager 100 also provides parameters, such as the session name 212, to the session clients 202. As depicted, the session clients 202 include clients 106A, 106B, 106C and any other client identified for the multicast session. The session database 208 includes the multicast session information and communicates with multicast session manager 100 through communication channel 214 and to multicast session controller 206 through communication channel 216.

The multicast session controller 206 communicates with multicast server application 204 to provide instructions, such as create session instruction 218, and to receive back information, such as session status information 217. As depicted, the multicast server application 204 performs the multicast download from multicast dataset storage 112 to the session clients 106A, 106B, 106C, . . . through the multicast download 110A. It is again noted that communication channels, such as represented by elements 110A, 119, 210, 212, 214, 216, 217, 218, 220 and 222, can be wireless or wired communication channels, as desired, and these communication channels can also take advantage of one or more intervening communication systems in order to provide communications between system components. In the depicted embodiment, therefore, the dynamically managed multicast system of the present invention includes five basic components: the multicast server application 204, the session clients 106 and their client imaging tools, the multicast session manager 100, the multicast session controller 206, and the session database 208.

In operation in a build-to-order manufacturing environment, the client systems can be part of a manufacturing line infrastructure, as depicted in FIG. 1. In such an embodiment, the multicast server application 204 can distribute a copy of a hard disk file to one or more clients 106A, 106B, 106C . . . via an IP multicast download 110A. The multicast server application 204 takes as an input the parameters 222 required to create a new multicast session. A client imaging tool can be installed and operated on the clients 106A, 106B, 106C . . . , and this client imaging tool can receive an image file, or other software or data as desired, via the IP multicast 110A. The client imaging tool can then write the image file to the local hard disk for the client. The client imaging tool takes as an input parameter the multicast session name 212, which is used to join the multicast session in order to receive the file, software or data through the IP multicast 110A. The session database 208 stores data related to the multicast session and can provide the multicast session manager 100 visibility into all currently running and future multicast sessions.

In this manufacturing environment, the multicast session manager 100 will receive requests 210 from clients 106A, 106B, 106C . . . for a multicast session for a dataset download when they are in a software installation phase. The multicast session manager 100 creates a new session, if required, or assigns the client to an already existing session. In the case of a new session being required, the session manager 100 resolves a unique set of session parameters for the new session. In addition to a unique session name, one important parameter can be the session's start time. The start time, as discussed further below, can be calculated to help maximize the number of clients that have an opportunity to join the session such that the run-rate of the manufacturing line is unaffected. To further refine the start time (either start earlier or start later), a client count can be measured. The client count is the number of similar clients that will be in software installation phase within a given period. To help make this determination, each client 106A, 106B, 106C . . . can send to the session manager 100 status updates during the phases prior to software installation. Alternatively, another system that is monitoring the progress of each client 106A, 106B, 106C . . . can send this status message. Thus, in this way, the estimated time of arrival of a client into the software installation phase can be more easily calculated. The first client system that enters software installation looking to download a particular image or dataset can be configured to trigger the creation of a new multicast session with the start time calculated, as described in more detail below. Any additional clients that wish to download the same image or dataset and that enter software installation phase before the start time has arrived can also be assigned to this same multicast session.

A wide variety of algorithms can be utilized to determine and manage session parameters. When the session manager 100 creates a new session, the session manager 100 can use such algorithms to calculate or determine parameters that can be used by the multicast session controller 206 to control the multicast session. As discussed above, two such parameters that can be managed by the session manager 100 are the client count and the start time, which can each be defined for each multicast session that is created. As stated above, other parameters could also be determined and managed, as desired. It is noted that build-to-order manufacturing, where information handling systems are built according to customer selected configurations, can benefit greatly from the present invention because the download needs of each new information handling system being manufactured can vary due to the customer configuration selections. Thus, the download needs must often be managed on a real-time or near real-time basis.

With respect to start time calculation in a manufacturing or build-to-order manufacturing line environment, for example, the following start time calculation algorithm can be utilized:

$$\text{START TIME} = \text{Current Time} + T_{wait} \qquad \text{[Equation 1]}$$

$$T_{wait} = T_{si} - T_{download} - T_{layering} - T_{sw\_setup} \qquad \text{[Equation 2]}$$

In the START TIME equation (Equation 1), "current time" represents the time at which the multicast download request for a client is being analyzed by the session manager 100. The expression "$T_{wait}$" in the wait time equation (Equation 2) represents the maximum time that the multicast session can wait before starting the multicast download such that the run-rate of the manufacturing line is not affected. The expression "$T_{si}$" represents the maximum time allowed for the software installation phase of the manufacturing process in order to support the run-rate of the manufacturing line. And this manufacturing run-rate can be dependent upon a variety of factors including the type of factory and the nature the manufacturing lines. The expressions "$T_{download}$" represents the amount of time the software download will take and can be calculated by dividing the download size by the download speed. The expression "$T_{layering}$" represents the time spent downloading any additional software parts that were not included in the multicast download. Finally, the expression "$T_{sw\_setup}$" represents the time spent performing additional post-download software set-up for the client after the multicast software download and any additional software downloading has been completed. For example, final configuration of the customer's applications and hardware drivers is typically implemented during this "$T_{sw\_setup}$" step. It is noted that this last step, as with other steps, may not be performed for some client configurations. It is further noted that the above equation and expressions are only an example, and, as stated above, other algorithms and calculations could be utilized, as desired, for managing start times.

The multicast session controller 206 acts as the interface between the multicast session manager 100 and the multicast server application(s) 204. The session controller 206 initiates the creation of a multicast session on request from the session manager 100. The session controller 206 can accomplish this task by launching a new instance of the multicast server application for each multicast session and by providing the multicast server application with the session parameters, for example, via a command-line interface. In the case of a service-type multicast server application, the controller 206 can send a message requesting a new session with the session parameters included in the message. It is noted that other session creation steps could also be used depending upon the multicast application software being utilized for the multicast server application 204. It is also noted that one or more server systems can be utilized to operate multicast controller and server application software in order to provide the multicast infrastructure components.

Figure 3:
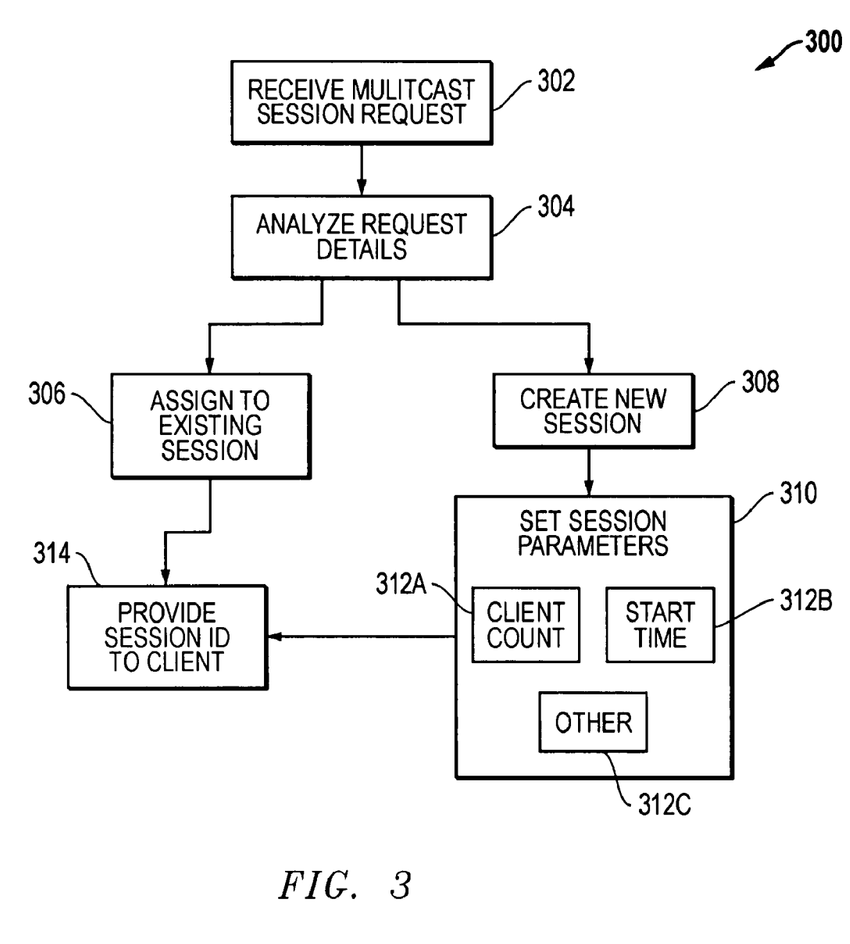
FIG. 3 is an embodiment for a process flow diagram for dynamically managing session parameters for a multicast system, according to the present invention.

FIG. 3 is an embodiment 300 for a process flow diagram for dynamically managing session parameters for a multicast system, according to the present invention. In block 302, the session manager 100 receives a multicast session request from a client 106 when the client 106 is in a software installation phase. This software installation phase can include any condition in which a client 106 wants to receive one or more datasets through software download. As discussed herein, with respect to a manufacturing line, this software installation phase may be a point during manufacturing when an information handling system is having software datasets downloaded to it as part of the manufacturing process. The session manager 100 analyzes the request details in block 304 with respect to information about the current and future sessions that is available from the sessions database 208. Depending upon the results of this analysis, the session manager 100 can proceed to block 308 and create a new session, or the session manager 100 can proceed to block 306 and assign the client 106 to an existing session. If a new session is created in block 308, the session manager then proceeds to block 310 where it sets the session parameters, such as client count 312A, and/or start time 312B and/or any other desired session parameter as represented by element 312C. From block 310, as well as from block 306, flow passes to block 314, where the session manager 100 provides the session name or identification (ID) to the client 106.

Figure 4:
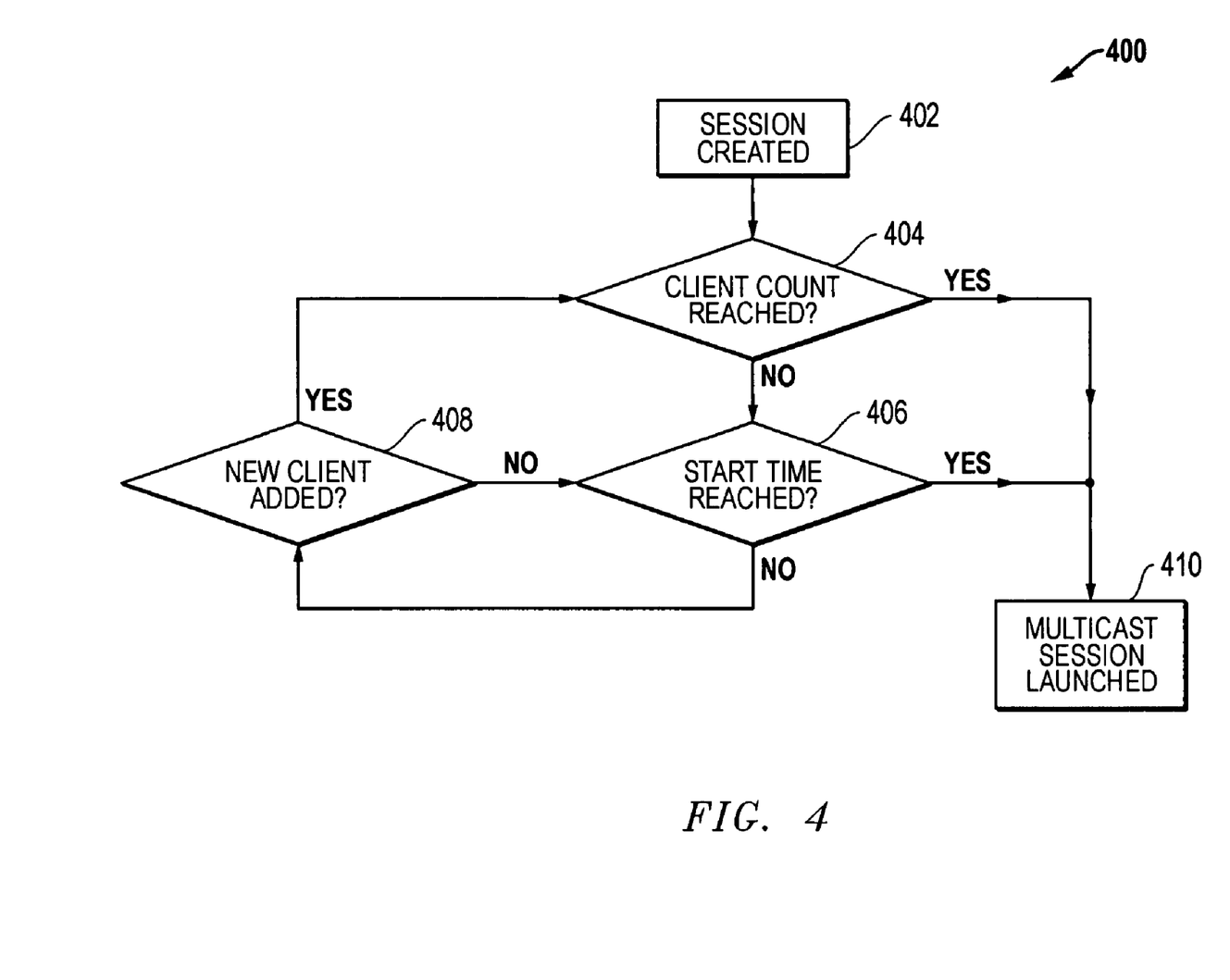
FIG. 4 is an embodiment for a process flow diagram for managing the start of a multicast session, according to the present invention.

FIG. 4 is an example embodiment 400 for a process flow diagram for managing the start of a multicast session, according to the present invention. In block 402, a session is created and, as part of this creation, will receive a client count parameter and/or a start time parameter. In decision bock 404, a determination is made as to whether the client count has been reached. If "yes," flow passes to block 410 where the multicast session is launched and the download begins. If "no," flow passes to decision block 406 where a determination is made as to whether the start time has been reached. If "yes," then flow passes to block 410 where the multicast session is launched and the download begins. If "no," the flow passes to decision block 408 where a determination is made as to whether a new client is being added. If "yes," flow passes to block 404. If "no," flow passes to block 406.

In operation in a build-to-order manufacturing environment, the client systems can be part of a manufacturing line infrastructure, as depicted in FIG. 1. In such an embodiment, at the beginning of the software installation phase, each client 106 can send a message to the session manager 100 requesting the name of the multicast session to join in order to download a particular image or dataset. The session manager 100 then examines this message and from its contents determines whether to create a new multicast session for the client or to add the client to an already existing session. In the case of a new session being created, the session manager requests the appropriate session controller 206, on the appropriate file server, to create a new session. The session controller 206 then initiates the creation of the new session with the multicast server application 204 and informs the session manager 100 that the session has been created. The session manager 100 then replies to the client 106 with the session name 212 whereupon the client launches an imaging tool, which joins the client 106 to the multicast session. As soon as the required or selected number of clients has joined the session, or the start time has arrived, the multicast server application 204 begins the multicast download 110A. When the download is complete, the multicast server application 204 shuts down automatically (in the case of a service-type multicast server application, the multicast server application 204 will simply wait for the next request from the session controller 206), and the session controller 206 informs the session manager 100 that the session is finished.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A manufacturing system for manufacture of information handling systems including a managed multicast download system, comprising:

a manufacturing line configured to manufacture a plurality of information handling systems, the manufacturing line including a software installation phase in which datasets are downloaded to the information handling systems through a plurality of multicast downloads while the information handling systems are being manufactured;

a plurality of information handling systems being manufactured within the manufacturing line and configured to communicate through communication channels with multicast infrastructure to receive datasets through the communication channels during the manufacture of the information handling systems;

multicast infrastructure in communication with the manufacturing line and configured to download datasets to the information handling systems through the communication channels using a plurality of multicast downloads; and a multicast session manager in communication with the manufacturing line and the multicast infrastructure, the multicast session manager being configured to receive multicast download requests related to the information handling systems when they reach the software installation phase, to create a plurality of multicast sessions based upon the requests, to assign each information handling system to a multicast session, and to provide one or more multicast session control parameters to the multicast infrastructure to cause the datasets to be downloaded to the plurality of information handling systems through the communication channels of while the information handling systems are being manufactured within the manufacturing line;

wherein the one or more multicast session control parameters comprises a start time for each multicast session, the start time representing a time period after which the multicast session download will begin;

wherein the start time is calculated by the multicast session manager utilizing a time at which a multicast download session is being created plus a wait time, wherein the wait time represents an amount of time after which a run-rate for the manufacturing line would be affected;

wherein the wait time is also calculated utilizing a value representing a time to download a dataset requested to be downloaded and a value representing a time allowed in the manufacturing line for software installation;

wherein the wait time is also calculated utilizing a value representing a time to download additional datasets not part of the multicast download and a value representing additional post-download set-up time; and wherein the plurality of information handling systems are being manufactured within a build-to-order manufacturing line where information handling systems are built according to customer selected configurations.

2. The manufacturing system of claim 1, wherein the one or more multicast session control parameters comprises a client count for each multicast session, the client count representing a number of information handling systems after which if assigned to the multicast session, the multicast session will begin.

3. The manufacturing system of claim 1, wherein the one or more multicast session control parameters comprises a start time and a client count for each multicast session, wherein the start time representing a time period after which the multicast session download will begin, and wherein the client count representing a number of information handling systems after which if assigned to the multicast session, the multicast session will begin.

4. The manufacturing system of claim 1, wherein the information handling systems comprise personal computers.

5. A multicast session manager for a manufacturing system for information handling systems, comprising a session parameter controller configured to receive multicast download requests related to a plurality of information handling systems being manufactured in a manufacturing line when they reach a software installation phase during their manufacture, to create a plurality of multicast sessions based upon the requests, to assign each information handling system to a multicast session, to define one or more multicast session control parameters for each multicast session, and to cause datasets to be downloaded to the information handling systems through communication channels while the information handling systems are being manufactured within the manufacturing line;

wherein the one or more multicast session control parameters comprises a start time for each multicast session, the start time representing a time period after which the multicast session download will begin;

wherein the start time is calculated by the multicast session manager utilizing a time at which a multicast download session is being created plus a wait time, wherein the wait time represents an amount of time after which a run-rate for the manufacturing line would be affected;

wherein the wait time is also calculated utilizing a value representing a time to download a dataset requested to be downloaded and a value representing a time allowed in the manufacturing line for software installation;

wherein the wait time is also calculated utilizing a value representing a time to download additional datasets not part of the multicast download and a value representing additional post-download set-up time; and wherein the plurality of information handling systems are being manufactured within a build-to-order manufacturing line where information handling systems are built according to customer selected configurations.

6. The multicast session manager of claim 5, wherein the one or more multicast session control parameters comprises a client count for each multicast session, the client count representing a number of information handling systems after which if assigned to the multicast session, the multicast session will begin.

7. A method for downloading datasets to information handling systems
during the manufacture of the information handling systems in a manufacturing line, comprising:

providing a plurality of information handling systems being manufactured within a manufacturing line and configured to manufacture the plurality of information handling systems, the plurality of information handling systems being configured to communicate through communication channels during the manufacture of the information handling systems;

receiving multicast download requests related to the plurality of information handling systems in the manufacturing line when they reach a software installation phase while the information handling systems are being manufactured;

creating a plurality of multicast sessions based upon the requests; assigning each information handling system to at least one multicast session; and downloading one or more datasets to the information handling systems through the communication channels using the plurality of created multicast sessions while the information handling systems are being manufactured within the manufacturing line;

wherein the defining step comprises defining a start time for each multicast session, the start time representing a time period after which the multicast session download will begin;

wherein the start time is calculated by a multicast session manager utilizing a time at which a multicast download session is being created plus a wait time, wherein the wait time represents an amount of time after which a run-rate for the manufacturing line would be affected;

wherein the wait time is also calculated utilizing a value representing a time to download a dataset requested to be downloaded and a value representing a time allowed in the manufacturing line for software installation;

wherein the wait time is also calculated utilizing a value representing a time to download additional datasets not part of the multicast download and a value representing additional post-download set-up time; and wherein the plurality of information handling systems are being manufactured within a build-to-order manufacturing line where information handling systems are built according to customer selected configurations.

8. The method of claim 7, wherein the creating step further comprises defining one or more multicast session control parameters for each multicast session being created.

9. The method of claim 7, wherein the defining step comprises defining a client count for each multicast session, the client count representing a number of information handling systems after which if assigned to the multicast session, the multicast session will begin.

10. The method of claim 7, wherein the information handling systems are personal computers.

* * * * *